US006362450B1

(12) United States Patent
Severance, Jr.

(10) Patent No.: US 6,362,450 B1
(45) Date of Patent: Mar. 26, 2002

(54) GAS FLOW FOR PLASMA ARC TORCH

(75) Inventor: Wayne Stanley Severance, Jr., Darlington, SC (US)

(73) Assignee: The ESAB Group, Inc., Florence, SC (US)

(*) Notice: Subject to any disclaimer, the term of this patent is extended or adjusted under 35 U.S.C. 154(b) by 0 days.

(21) Appl. No.: 09/772,652

(22) Filed: Jan. 30, 2001

(51) Int. Cl.[7] ................................................ B23K 10/00
(52) U.S. Cl. .................. 219/121.5; 219/75; 219/121.51
(58) Field of Search ........................ 219/74, 75, 121.51, 219/121.52, 121.5, 121.48, 121.36

(56) References Cited

U.S. PATENT DOCUMENTS

| | | | | |
|---|---|---|---|---|
| 3,004,189 A | | 10/1961 | Giannini | |
| 3,042,830 A | | 7/1962 | Orbach | |
| 3,562,486 A | | 2/1971 | Hatch et al. | |
| 4,463,245 A | | 7/1984 | McNeil | |
| 4,558,201 A | | 12/1985 | Hatch | |
| 4,580,032 A | | 4/1986 | Carkhuff | |
| 4,650,953 A | | 3/1987 | Eger et al. | |
| 4,877,937 A | | 10/1989 | Müller | |
| 4,973,816 A | * | 11/1990 | Haberman | 219/121.48 |
| 4,992,642 A | | 2/1991 | Kamp et al. | |
| 5,023,425 A | | 6/1991 | Severance, Jr. | |
| 5,216,221 A | * | 6/1993 | Carkhuff | 219/121.51 |
| 5,278,388 A | * | 1/1994 | Huang | 219/121.51 |
| 5,681,489 A | | 10/1997 | Carkhuff | |
| 5,726,415 A | | 3/1998 | Luo et al. | |

* cited by examiner

*Primary Examiner*—Mark Paschall
(74) *Attorney, Agent, or Firm*—Alston & Bird LLP

(57) ABSTRACT

A plasma arc torch and method are provided for directing a flow of gas substantially the length of an electrode before splitting the gas into a primary flow and a secondary flow. The torch includes an electrode having a metallic holder defining a plurality of openings at a forward end for directing all of the gas therethrough and into a chamber defined by the holder and a nozzle. The nozzle defines a central bore and a plurality of secondary openings for splitting the gas in the nozzle chamber into at least the primary flow and the secondary flow.

35 Claims, 2 Drawing Sheets

GAS FLOW FOR PLASMA ARC TORCH

FIELD OF THE INVENTION

The present invention relates to plasma arc torches and, more particularly, to a method and apparatus for supplying a gas flow for supporting an electric arc in a plasma arc torch.

BACKGROUND OF THE INVENTION

Plasma arc torches are commonly used for the working of metal, including cutting, welding, surface treatment, melting, and annealing. Such torches include an electrode which supports an arc which extends from the electrode to a workpiece in the transferred arc mode of operation. It is also conventional to surround the arc with a swirling vortex flow of gas, and in some torch designs it is conventional to also envelop the gas and arc in a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element embedded therein, which supports the arc. The emissive element is composed of a material which has a relatively low work function, which is defined in the art as the potential step, measured in electron volts (ev), which permits thermionic emission from the surface of a metal at a given temperature. In view of this low work function, the element is thus capable of readily emitting electrons when an electrical potential is applied thereto. Commonly used emissive materials include hafnium, zirconium, tungsten, and alloys thereof. A nozzle surrounds the discharge end of the electrode and provides a pathway for directing the arc towards the workpiece.

A problem associated with torches of the type described above is the short service life of the electrode, particularly when the torch is used with an oxidizing gas, such as oxygen or air. More particularly, the emissive elements of these torches often erode below the surface of the copper holder at the discharge end. Additionally, the gas tends to rapidly oxidize the copper of the electrode that surrounds the emissive element and, as the copper oxidizes, its work function decreases. As a result, a point is reached at which the oxidized copper surrounding the emissive element begins to support the arc, rather than the emissive element. When this happens, the copper oxide and the supporting copper melt, resulting in early destruction and failure of the electrode.

In order to prevent or reduce the formation of oxidized copper surrounding the emissive element, particularly for air cooled plasma arc torches, the air is circulated rapidly about the electrode to improve heat transfer from the arc away from the electrode. A conventional method for the air to be distributed in an air cooled plasma arc torch is for the air to first be used in some fashion to cool the electrode and then to be split into separate primary and secondary flows. Typically, this is accomplished by means of a gas baffle positioned between the nozzle and the electrode for splitting the flow into the primary or cutting gas flow and the secondary or shield gas flow, which helps maintain the position of the arc. More specifically, the primary flow of the gas passes through holes in the gas baffle into a chamber defined by a primary nozzle and the electrode and is ejected by the primary nozzle, while the rest of the gas is directed out a secondary nozzle so as to surround the primary gas flow. Disadvantageously, the baffle splits the gas into the primary flow and secondary flow before the nozzle chamber, which limits the ability of the torch to transfer heat from the electrode and can reduce the speed of the torch, as discussed below.

Baffles also add to the cost and complexity of manufacturing and assembling the torch. More specifically, baffles are subject to failure and can occasionally be inadvertently omitted by an operator during assembly of the torch. Furthermore, baffles tend to become brittle over time and eventually develop cracks, which often lead to catastrophic failure unless the baffles are frequently replaced. Even when replaced on a regular preventative maintenance cycle, which adds further cost to the torch, human error may lead to the baffles being left out during assembly of the torch, which can damage the torch or cause the torch to operate incorrectly. In addition, baffles can also permit the arc to "jump" or track across the baffle, which can also damage the torch. Specifically, the use of baffles can result in a convoluted set of passages in and around the electrode through which air can pass, which can lead to migration of the arc through the passages. Although attempts have been made to insulate the labyrinth of passages through the torch, arcing through the often damp air in the passages has been a problem with conventional torches.

Another problem with conventional torches is the lack of cooling achieved by the gas due to splitting the gas into different flows before the gas has circulated along substantially the entire length of the electrode. In particular, many torches split the gas into the primary and secondary flows at a location intermediate the opposite ends of the electrode. This is considered necessary in order to limit the pressure realized in the nozzle chamber while providing adequate flow for cooling. In order to cool the torch while avoiding failure of the torch due to excessive nozzle pressure, often as much as 70–90% of the total gas supplied to a conventional torch is diverted away from the nozzle chamber to other outlets, which direct the secondary flow. As a result, only a portion of the total gas supplied to the torch is available for cooling the electrode along substantially the entire length of the electrode, and even less gas pressure than is optimal may be available at the exit end of the nozzle as a primary gas flow. Accordingly, conventional torches have limited cutting speeds, which adds time and expense to the torch operation. It is desirable to provide a greater nozzle chamber pressure so that higher cutting speeds can be realized. This is a difficult proposition, however, due to the limitations of conventional torches as described, and for the fact that most manufacturing locations and welding shops use standard "shop" air pressure that cannot be increased in order to increase the gas pressure in the nozzle chamber.

Several patents discuss plasma arc torches having various flow patterns. For example, U.S. Pat. No. 5,726,415 to Luo et al. discloses a plasma are torch with an electrode having an metallic holder with an emissive element positioned at a discharge end thereof. The torch also includes a nozzle, which in combination with the holder defines an annular gas chamber therebetween for directing a cooling gas about the electrode. The nozzle also defines a cylindrical exhaust port for directing a primary gas flow towards a workpiece, and bleed ports positioned in the rear portion of the nozzle for venting a majority of the gas through bores for use as a shield or secondary gas flow. In operation, the bleed ports bleed approximately 90% of the gas, thus leaving 10% of the gas to cool the full length of the electrode and exit the cylindrical exhaust port as the primary gas flow towards the workpiece. Thus, only a fraction of the gas entering the torch travels substantially the length of the electrode, which decreases the cooling capability of the gas.

U.S. Pat. No. 4,558,201 to Hatch discloses a plasma arc torch having a reversible electrode that has both a forward insert and a rearward insert positioned at opposing ends thereof. The electrode defines a plurality of passageways for directing the gas towards a workpiece. In particular, gas is directed through channels around the exterior of the electrode as well as through a central passage extending along the longitudinal axis of the electrode. As the gas reaches the midpoint of the electrode, however, the gas is split into a primary flow and a secondary flow, wherein the secondary flow is directed away from the electrode around an insulator to a front portion of a chamber defined by a nozzle and the insulator. The primary flow is directed out a central orifice in the nozzle along with the electrical arc extending from the forward emissive insert to the workpiece. As in the Luo '415 patent, the gas flow is split into a primary flow and a secondary flow before the gas has traveled substantially the length of the electrode, which decreases the heat transfer capability of the gas and provides less gas pressure in the nozzle chamber, which decreases the efficiency of the torch.

Thus, there is a need to provide sufficient gas flow to the torch in order to transfer heat away from the arc and the torch, but without sacrificing cutting speed or pressure realized in the nozzle chamber. It is also desirable to provide a torch with simple assembly and without using baffles to direct a flow of gas from the electrode to the nozzle chamber.

SUMMARY OF THE INVENTION

The above and other objects and advantages of the present invention are achieved by a plasma arc torch that directs a flow of gas along substantially the length of the electrode such that more gas is used to cool the torch compared to conventional torches. The torch of the present invention includes an electrode defining a plurality of openings positioned proximate the front end of the electrode such that all of the gas supplied to the torch is directed through the openings into a chamber defined by the electrode and the nozzle. In this regard, the gas pressure in the nozzle chamber is increased compared to conventional torches, which allows the torch of the present invention to have a faster cutting speed. Advantageously, the torch of the present invention utilizes the openings in the electrode itself to direct the flow of gas, and not baffles as in conventional torches.

In particular, a plasma arc torch according to one embodiment of the present invention includes an electrode having an upper tubular member defining an internal bore and a lower cup-shaped member or holder defining a central passageway in fluid communication with the internal bore of the upper tubular member. The front end of the holder defines a cavity for receiving an emissive insert, and the rear end defines the central passageway. The holder also defines a plurality of side openings that are in fluid communication with the central passageway. In one embodiment, the side openings are arranged to impart a swirling motion to the gas flowing therethrough.

The plasma arc torch also includes a nozzle positioned proximate the front end of the holder such that a nozzle chamber is defined therebetween. The nozzle defines a central bore for discharging a primary flow of gas towards a workpiece, and in one embodiment also defines a plurality of secondary openings for creating a secondary flow of gas therethrough. Advantageously, the openings defined in the nozzle and holder eliminate the need for separate baffles for separating the gas flow into the primary and secondary flows.

Safety items are also a part of the torch of the present invention. More specifically, in one embodiment a ball valve assembly is located in the internal bore of the upper tubular member of the electrode for regulating gas flow through the electrode. In this regard, the ball valve assembly acts to protect the torch from damage if a user attempts to operate the torch with portions of the torch missing, such as the holder of the electrode, by cutting off the gas flow through the torch. The plasma arc torch of the present invention can also include a pressure switch in fluid communication with the nozzle chamber. The pressure switch can disable the torch if the gas pressure in the torch, such as in the nozzle chamber, is below a predetermined value, which may occur if the torch is assembled incorrectly or if the torch is damaged.

Methods are also a part of the present invention. According to one method of the present invention, a electrode having a metallic holder is provided, wherein the holder defines a plurality of side openings and a central passageway in fluid communication therewith. A nozzle is positioned proximate the holder to define a nozzle chamber therebetween. A flow of gas is directed through the central passageway into the nozzle chamber such that all of the gas supplied into the central passageway is directed through the side openings into the nozzle chamber. Advantageously, the gas is split into at least a primary flow and a secondary flow after the flow of gas has entered the nozzle chamber, which provides greater pressure in the nozzle chamber and allows for greater cutting speeds. To improve the ability of the torch to transfer heat from the arc, the flow of gas is directed through the central passageway a distance more than ½ the length of the holder before being directed through the side openings thereof. As such, more gas is available for transferring heat from the arc and electrode away from the torch.

As mentioned above, the flow of gas can also be directed to certain safety devices, such as the flow-regulating ball valve assembly, or to the pressure switch that is in fluid communication with the nozzle chamber. Advantageously, the torch is disabled if certain conditions occur, such as having a gas pressure in the torch that is below a predetermined value.

Accordingly, the present invention provides a plasma arc torch that overcomes the disadvantages of conventional torches without sacrificing the cutting speed of the torch or the pressure realized in the nozzle chamber. Advantageously, the torch and methods of the present invention avoid the use of baffles to direct the flow of gas from the electrode to a primary flow and a secondary flow, which improves the assembly, reliability, and cost of the torch.

BRIEF DESCRIPTION OF THE DRAWINGS

Figure 1:
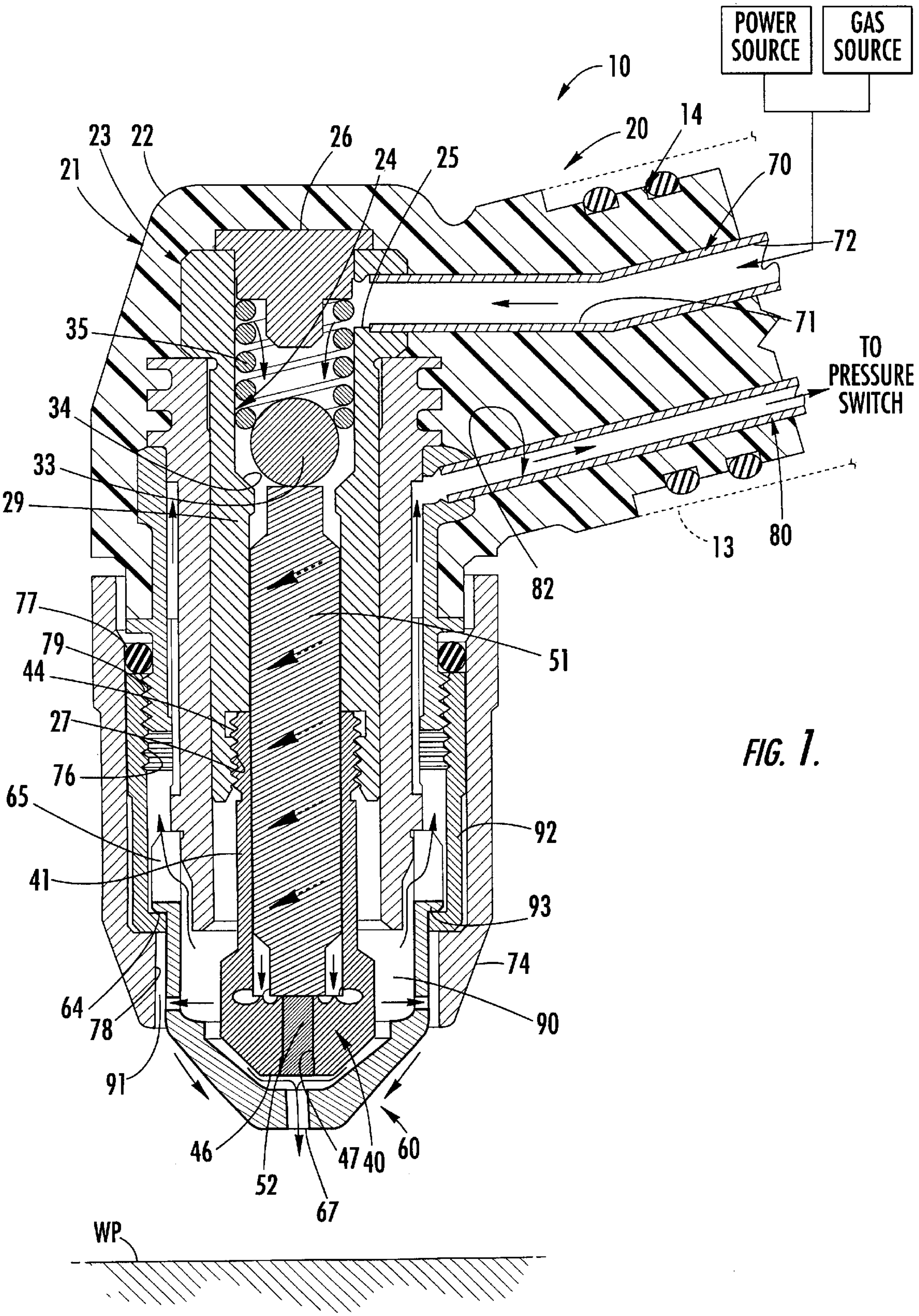
Figure 2:
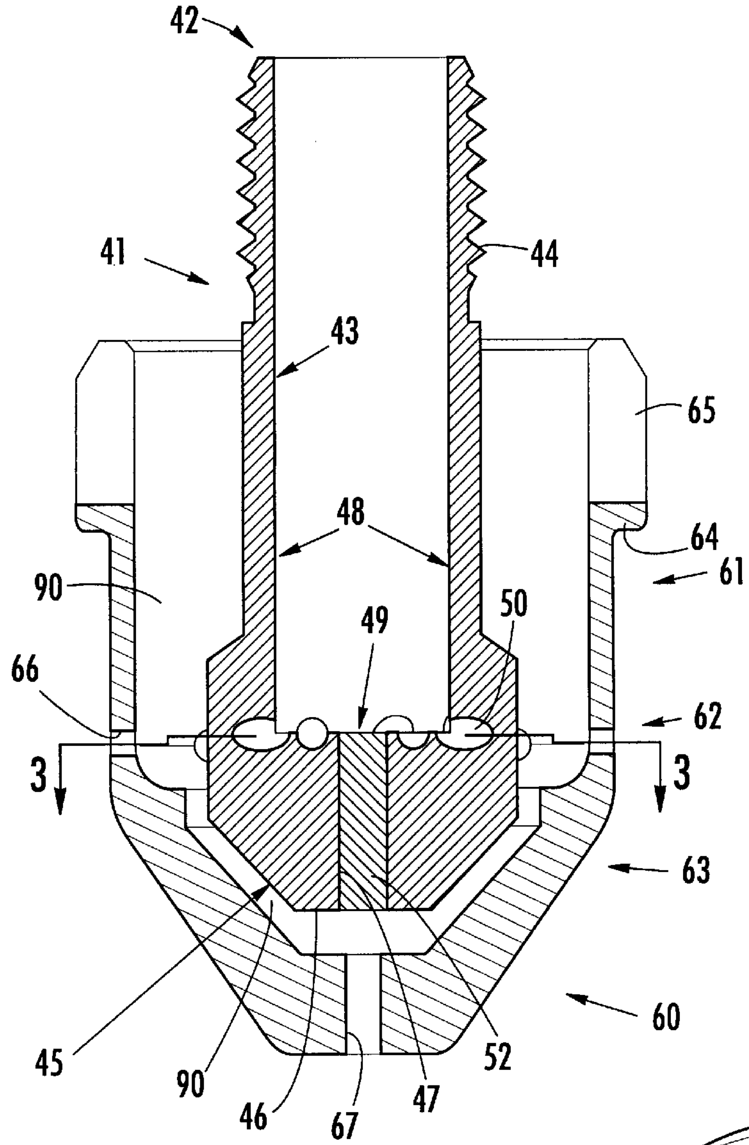
Figure 3:
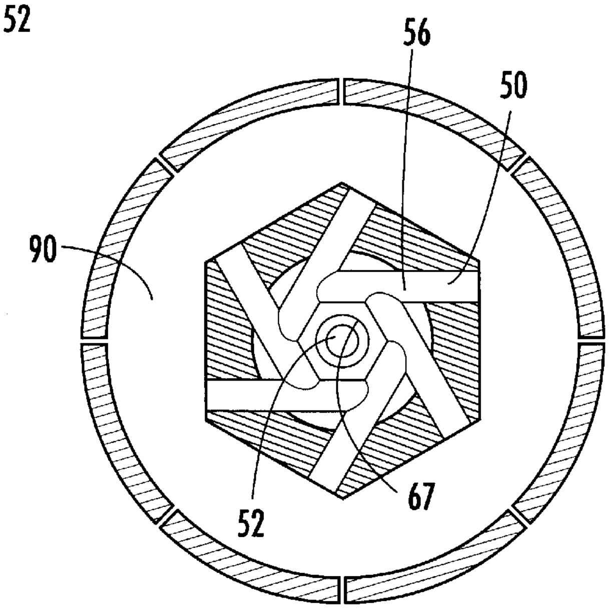

Having thus described the invention in general terms, reference will now be made to the accompanying drawings, which are not necessarily drawn to scale, wherein:

FIG. 1 is a cross-sectional view of a front portion of a plasma arc torch according to the present invention;

FIG. 2 is a detailed cross-sectional view of a portion of an electrode and a nozzle according to one embodiment of the present invention; and FIG. 3 is a detailed cross-sectional view taken along lines 3—3 of FIG. 2 according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to the accompanying drawings, FIG. 1 illustrates a preferred embodiment of a plasma arc torch, indicated generally at 10, according to the invention. The torch 10 comprises a torch body 20 and electrode 40 mounted within the torch body, and a handle 13 secured to the torch body, such as by press fitting over a plurality of bushings 14. The torch 10 further comprises a supply line 70 for directing a pressurized flow of gas through the torch body 20 and directing electrical power to the electrode 40. In one embodiment, the torch 10 also includes a detecting device 80 for sensing the gas pressure in the torch body 20 and for disabling the flow of electrical current to the electrode 40 in accordance with the present invention.

As shown in FIG. 1, the torch body 20 comprises a generally cylindrical head portion 21 defining a discharge axis. The head portion 21 includes a housing 22 surrounding a portion of the electrode 40 along the discharge axis. The housing 22 is typically made of a hard, heat-resistant material, such as thermoset plastic or epoxy compound, which protects the components of the torch from the high heat generated during plasma arc cutting. The electrode 40 includes an upper tubular member 23 and a lower cup-shaped member or holder 41. The upper tubular member 23 defines an internal bore 24 which is coaxially aligned with the discharge axis. In one embodiment, the internal bore 24 includes a valve seat 34, as discussed more fully below. The upper tubular member 23 is made of an electrically conductive material, preferably copper or copper alloy, such that the upper tubular member conducts an electrical current to other portions of the electrode 40. The upper tubular member 23 also defines a passageway 25 such that the internal bore 24 is in fluid communication with the supply line 70. In addition, a cap 26 is secured to the top of the upper tubular member 23 for directing gas along the discharge axis. In one embodiment, the upper tubular member 23 includes an internally threaded portion 27.

The supply line 70 comprises a hollow conduit 72 defining a gas passageway and is positioned within the torch body 20. The conduit 72 originates at a source of pressurized gas and terminates in the passageway 25 of the upper tubular member 23 of the electrode 40 such that the source of pressurized gas is in fluid communication with the internal bore 24. Supply line 70 further comprises a power supply cable 71 electrically connected to the conduit 72 and a power source such that the power source is electrically connected to the electrode 40.

FIG. 2 illustrates one embodiment of the holder 41 of the electrode 40. In particular, the holder 41 is made of an electrically conductive material, preferably copper or copper alloy. The holder 41 has a rear end 42 defining a central passageway 43 that is in fluid communication with the internal bore 24 of the upper tubular member 23. In one embodiment, the rear end 42 includes a plurality of external threads 44 suitable for threadably engaging the internally threaded portion 27 of the upper tubular member 23. The holder 41 also includes a front end 45 having a front face 46 and defining a front cavity or opening 47 therein. The holder 41 includes side walls 48 and a transverse end wall 49 that define the central passageway 43.

The holder 41 also defines a plurality of openings 50 that are positioned in the side walls 48 adjacent the end wall 49. Advantageously, the openings 50 are located at a position less than one-half the length of the holder 41 from the front face 46 thereof. In a preferred embodiment, the openings 50 are located proximate the end wall 49 of the holder 41 at the forward end of the central passageway 43 and, according to one embodiment, are directed non-radially so that gas passing through the openings is swirled about the holder 41. In one embodiment shown in FIG. 3, the end wall 49 defines a plurality of channels 56 corresponding to the openings 50 for directing the gas from the central passageway 43 through the openings. As discussed below, gas is directed through the supply line 70 and into the internal bore 24 of the upper tubular member 23. The gas is then directed into the central passageway 43 of the holder 41 towards the openings 50 so as to cool the electrode while the torch 10 is in use. To further the cooling action of the gas, a channeled valve pin 51 can be positioned in the internal bore 24 and central passageway 43 for increasing the velocity of the gas therein, such as by swirling the gas. In this manner, the gas receives more contact with the electrode 40, which thereby increases the heat transfer between the electrode and the gas. The pin 51 can also be used as a safety device, as discussed more fully below.

In one embodiment, the front end 45 of the holder 41 includes an emissive element 52 disposed in the opening 47. The emissive element 52 acts as the cathode terminal for an electrical arc extending from the front end of the electrode 40 in the direction of a workpiece WP, as discussed more fully below. For example, an electrode comprising an emissive element is disclosed in U.S. Pat. No. 5,023,425 to Severance, Jr., and assigned to the assignee of the present invention. The emissive element 52 is composed of a material which has a relatively low work function, defined in the art as the potential step, measured in electron volts, that permits thermionic emission from the surface of a metal at a given temperature. In view of its low work function, the emissive element readily emits electrons in the presence of an electrical potential. Commonly used insert materials include hafnium, zirconium, tungsten, and alloys thereof.

In addition, a relatively non-emissive separator (not shown) may also be positioned about the emissive element 52 at the front end 45 of the holder 41. In particular, the separator is positioned about the emissive element 52 in the opening 47 of the electrode. The separator is composed of a metallic material having a work function which is greater than that of the material of the holder 41, and also greater than that of the material of the emissive element 52. In this regard, it is preferred that the separator be composed of a metallic material having a relatively high work function. Several metals and alloys are usable for the non-emissive separator of the present invention, such as silver, gold, platinum, rhodium, iridium, palladium, nickel. The emissive element 52, separator, and holder 41 are flush with one another at the front face 46 of the holder.

As shown in FIG. 2, the torch 10 also includes a nozzle 60 positioned proximate the holder 41 of the electrode 40. The nozzle 60 includes an upper portion 61, a middle portion 62, and a frustoconical lower portion 63. The nozzle 60 is positioned about the holder 41 such that a chamber 90 is defined therebetween. The upper portion 61 of the nozzle 60 defines a plurality of slots 65 through which air pressure form the nozzle chamber 90 is communicated to the detecting device 80. The middle portion 62 of the nozzle forms a shoulder 64 with the upper portion 61 and defines a plurality of openings 66 therethrough such that the nozzle chamber 90 is in fluid communication with a shield or secondary gas flow port 91, which is defined between the nozzle 60 and an outer heat shield 74 and is in fluid communication with the ambient atmosphere (see FIG. 1). The lower portion 63 of the nozzle 60 defines a central bore 67 for discharging gas from the nozzle chamber 90 toward the workpiece WP located adjacent the nozzle.

The nozzle 60 is held in place about the holder 41 by the outer heat shield 74. In one embodiment, the heat shield 74, which is preferably formed of an electrically insulating material, includes a metallic sleeve 92 having a transverse portion 93 at one end and threaded portion 76 at the other end. The threaded portion 76 threadably engages a threaded surface 79 of the housing 22, and the transverse portion 93 engages the shoulder 64 provided on the nozzle 60 to hold the nozzle in place about the holder 41 when the heat shield 74 is secured on the torch body 20. Once installed, the heat shield 74 also defines a central opening 78 therethrough adjacent the nozzle 60 and coaxially aligned with the discharge axis such that the shield gas port flow 91 is defined between the heat shield and nozzle. A resilient O-ring 77 is positioned between the housing 22 and the heat shield 74 to protect the electrode 40 and nozzle 60 from external contaminants and to seal the torch body 20 when the heat shield is properly secured thereto.

The pressure detecting device 80 comprises a hollow conduit 82 defining a gas passageway within the torch body 20. More specifically, conduit 82 originates in the head portion 21 of torch body 20, and terminates at a pressure switch (not shown) such that the pressure switch is in fluid communication with the internal bore 24 of the upper tubular member 23 and the central passageway 43 of the holder 41 via the side openings 50 and the slots 65. The conduit 82 and pressure switch of this type are described in U.S. Pat. No. 5,681,489, which is assigned to the assignee of the present invention and incorporated herein by reference.

In operation, when an operator presses a control switch (not shown), a low voltage electrical circuit in the power source is closed. The electrical circuit opens a solenoid positioned in the power source such that the supply line 70 directs a singular, pressurized flow of gas through the conduit 72 to the head portion 21 and internal bore 24 of the upper tubular member 23. The pressurized gas may be any gas capable of forming a plasma flow, but preferably is air, oxygen or nitrogen. The gas is then directed to the central passageway 43 defined in the holder 41. Advantageously, all of the gas supplied into the central passageway 43 exits through the openings 50 positioned adjacent the end wall 49 of the holder 41 and into the nozzle chamber 90. Thus, the gas travels substantially the length of the electrode 40, such as to a position less than one-half the length of the electrode 40, and preferably one-half the length of the holder 41, measured along the longitudinal axis from the front face 46. As such, the torch of the present invention provides improved cooling to the electrode compared to conventional torches. As noted above, the openings 50 are preferably in a tangential formation, as shown in FIG. 3. This arrangement creates a swirling pattern about the front end 45 as the gas enters the nozzle chamber 90.

After the gas arrives in the nozzle chamber 90 via the openings 50, a primary flow portion of the gas is directed to the central bore 67 of the nozzle 60. In addition, the opening 66 defined in the middle portion 62 of the nozzle 60 allow a secondary flow portion of the gas to escape therethrough to the shield gas flow port 91. Thus, all of the gas present in the nozzle chamber 90 enters the nozzle chamber through the openings 50 in the holder 41. In this manner, higher nozzle pressures can be achieved, which allows for a higher cutting speed of the torch 10. Moreover, the gas is in contact with the electrode 40 for a longer period of time compared to conventional torches, which improves cooling of the torch.

As mentioned above, the flow of gas is initiated by an operator pressing a control switch. In order to supply electricity to the electrode, sufficient gas pressure must be present in the torch. More specifically, when the outer heat shield 74 is properly secured about the nozzle 60 on the torch body 20, the pressure detecting device 80 senses the gas pressure in the torch body, such as in the nozzle chamber 90. According to one embodiment of the present invention, the pressure in the nozzle chamber 90 should be at least approximately 30 psi using conventional "shop" air, which is about 75 psi. If the device 80 senses sufficient gas pressure in the nozzle chamber 90 for a predetermined time, typically about three seconds, the detecting device closes, or causes to be closed, an electrical circuit to permit the power source to supply electrical current to the torch 10. In other words, as long as there is sufficient gas pressure in the nozzle chamber 90, which can be achieved by maintaining a predetermined gas flow rate through a properly assembled torch, the power source will supply electrical current to the electrode 40.

If, however, there is insufficient gas pressure in the torch body 20, such as when the nozzle 60 is removed or misaligned, or if the heat shield 74 is removed, the pressurized gas flows through the openings 50 and primarily out the front of the torch to the atmosphere, so that substantially no gas enters the conduit 82 of the pressure detecting device 80. As a result, sufficient pressure of the gas is not sensed at the pressure switch via the conduit 82, which ceases electrical current to the electrode 40. In one embodiment, the torch 10 also includes a ball valve assembly capable of regulating the gas through the torch. In particular, the assembly includes a non-conductive ball 33 of spherical geometry that is positioned in the internal bore 24 of the upper tubular member 23 and is biased by a bias member 35, such as a spring, against the valve seat 34.

The valve pin 51 is capable of moving and holding the ball 33 away from the valve seat 34 when the holder 41 is properly installed and engaged with the upper tubular member 23. In particular, the ball 33 serves as a "parts in place" feature to protect the torch body 20 from damage should the holder 41 or valve pin 51 be left out. If either is omitted, the ball 33 remains against the valve seat 34, which prevents the gas from flowing through the internal bore 24 to the central passageway 43. As a result, the lack of gas flow prevents a pressure signal from being communicated to the pressure switch via the conduit 82, which must be satisfied for the power source to deliver current to the torch 10. Such a feature is described in U.S. Pat. No. 4,580,032 to Carkhuff, which is assigned to the assignee of the present invention and incorporated herein by reference.

Thus, the present invention provides a plasma arc torch and method of directing a flow of gas in the torch such that greater cooling of the electrode is achieved and increased cutting speeds can be realized compared to conventional torches. In particular, the electrode of the present invention provides a holder defining a plurality of openings proximate the front end thereof for directing all of the gas into the nozzle chamber before splitting the gas into primary and secondary flows. As such, the gas is in contact with the electrode along substantially the length of the electrode before it is split, which improves cooling of the electrode. Furthermore, gas baffles are not used in assembly of the torch to separate the gas into primary and secondary flows.

In this regard, the assembly time and cost of the torch are reduced, while providing an increase in nozzle chamber pressure and thus cutting speed of the torch.

Many modifications and other embodiments of the invention will come to mind to one skilled in the art to which this invention pertains having the benefit of the teachings presented in the foregoing descriptions and the associated drawings. For example, the sensing device and other safety features of the present invention are not mandatory in order to benefit from the teachings presented herein, but are recommended for operator safety and torch life. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A plasma arc torch, comprising:

an electrode including an upper tubular member defining an internal bore therethrough and a metallic holder having a front end and a rear end along a longitudinal axis, the front end having a front face defining a front cavity having at least an emissive element positioned therein, the rear end defining a central passageway in fluid communication with the internal bore for directing gas from the rear end to the front end of the holder, the holder further defining a plurality of side openings positioned proximate the front end of the holder that are in fluid communication with the central passageway;

a nozzle positioned proximate the front end of the holder and defining a nozzle chamber therebetween, said nozzle defining a central bore for discharging a primary flow of gas from the nozzle chamber toward a workpiece located adjacent the nozzle;

an electrical supply for creating an arc extending from the emissive element of said electrode through the central bore and to the workpiece; and a gas supply line through which all gas used by the torch is supplied, the gas supply line directing all of the gas to the central passageway of said electrode, wherein all of the gas is directed to the nozzle chamber from the central passageway through the side openings defined by the holder.

2. A plasma arc torch according to claim 1, wherein the nozzle further defines a plurality of secondary openings positioned across the nozzle chamber from the side openings at the front end of the metallic holder, the secondary openings creating a secondary flow of gas therethrough.

3. A plasma arc torch according to claim 1, further comprising a ball valve assembly located in the internal bore of the upper tubular member, said ball valve assembly capable of regulating the gas through the torch.

4. A plasma arc torch according to claim 1, further comprising a pressure detecting device in fluid communication with the nozzle chamber, said pressure detecting device disabling the torch if gas pressure in the nozzle chamber is below a predetermined value.

5. A plasma arc torch according to claim 1, wherein the side openings in the holder are arranged to impart a swirling motion to the gas flowing into the nozzle chamber.

6. A plasma arc torch according to claim 1, wherein the side openings defined by the holder are located at a position less than ½ the length of the holder along the longitudinal axis from the front face of the holder.

7. A plasma arc torch according to claim 1, wherein the upper tubular member defines a threaded portion and the holder defines a threaded portion for threadably securing the holder to the upper tubular member.

8. An electrode adapted for supporting an arc in a plasma arc torch, comprising:

an upper tubular member defining an internal bore therethrough and a threaded portion at one end thereof; and a metallic tubular holder defining a longitudinal axis and having a front and rear end, and a transverse end wall closing the front end, the transverse end wall having a front face and defining a cavity formed in the front face extending rearwardly along the longitudinal axis, the rear end defining a central passageway in fluid communication with the internal bore for directing gas to the front end of said holder, said holder further defining a plurality of side openings positioned proximate the front end of said holder that are in fluid communication with the central passageway such that the gas can exit the central passageway only via the side openings positioned proximate the front end of said holder.

9. An electrode according to claim 8, further comprising a ball valve assembly located in the internal bore of the upper tubular member, said ball valve assembly capable of regulating the gas through the electrode.

10. An electrode according to claim 8, wherein the side openings in said holder are arranged to impart a swirling motion to the gas exiting the side openings.

11. An electrode according to claim 8, wherein the plurality of side openings defined by the holder are located at a position less than ½ the length of the holder along the longitudinal axis from the front face of the holder.

12. An electrode according to claim 8, wherein the holder includes a threaded portion for threadably securing the holder to the upper tubular member.

13. A method of operating a plasma arc torch, comprising:

providing an electrode along a longitudinal axis having a metallic holder having a front end and a rear end defining a central passageway, the holder further defining a plurality of side openings that are in fluid communication with the central passageway, and a nozzle positioned proximate the front end of the holder defining a nozzle chamber between the nozzle and the holder; and directing a flow of gas from the central passageway into the nozzle chamber such that all of the gas is directed through the side openings into the nozzle chamber.

14. A method according to claim 13, further comprising splitting the flow of gas into at least a primary flow and secondary flow after the flow of gas has entered the nozzle chamber.

15. A method according to claim 14, farther comprising directing the primary flow of gas towards a workpiece through a central bore defined by the nozzle.

16. A method according to claim 14, farther comprising directing the secondary flow of gas through a plurality of secondary openings defined by the nozzle.

17. A method according to claim 13, wherein the flow of gas is directed through a flow regulating device in fluid communication with the central passageway.

18. A method according to claim 13, further comprising detecting pressure in the nozzle chamber, wherein the torch is disabled if the pressure is below a predetermined value.

19. A method according to claim 13, wherein the gas is directed into the nozzle chamber by swirling the gas via the side openings in the holder.

20. A method according to claim 13 , wherein all of the gas is directed through the central passageway of the holder a distance more than ½ the length of the holder along the longitudinal axis before being directed through the side openings thereof.

21. A method according to claim 13, further comprising supplying an electrical current to the electrode to create an electrical arc extending from the electrode to the workpiece.

22. A method according to claim 13, wherein the gas is swirled in the central passageway as the gas is directed to the side openings of the holder.

23. A method of operating a plasma arc torch, comprising:

providing an electrode having a metallic holder defining a central passageway, and a nozzle positioned proximate the front end of the holder and defining a nozzle chamber therebetween;

directing a flow of gas along the central passageway into the nozzle chamber such that all gas supplied into the central passageway enters the nozzle chamber; and splitting the flow of gas into at least a primary flow and a secondary flow by openings defined in the nozzle.

24. A method according to claim 23, further comprising directing the primary flow of gas towards a workpiece through a central bore defined by the nozzle.

25. A method according to claim 23, wherein the flow of gas is directed through a flow regulating device before entering the nozzle chamber.

26. A method according to claim 23, further comprising detecting pressure in the nozzle chamber, wherein torch is disabled if the pressure is below a predetermined value.

27. A method according to claim 23, wherein the gas is directed into the nozzle chamber by swirling the gas.

28. A method according to claim 23, wherein all of the gas is directed along the central passageway of the holder a distance more than ½ the length of the holder before being directed to the nozzle chamber.

29. A method according to claim 23, further comprising supplying an electrical current to the electrode to create an electrical arc extending from the electrode to a workpiece.

30. A method according to claim 23, wherein the gas is directed along the central passageway to the nozzle chamber by swirling the gas.

31. An electrode adapted for supporting an arc in a plasma arc torch, comprising:

an upper tubular member defining an internal bore therethrough and a threaded portion at one end thereof;

a metallic tubular holder defining a longitudinal axis and having a front and rear end, and a transverse end wall closing the front end, the transverse end wall having a front face and defining a cavity formed in the front face extending rearwardly along the longitudinal axis, the rear end defining a central passageway in fluid communication with the internal bore for directing a gas to the front end of said holder, said holder further defining a plurality of side openings positioned proximate the front end of said holder that arc in fluid communication with the central passageway such that the gas can exit the central passageway only via the side openings positioned proximate the front end of said holder; and a nozzle positioned proximate the front end of said holder and defining a nozzle chamber therebetween, said nozzle defining a central bore for discharging a primary flow of gas from the nozzle chamber toward a workpiece located adjacent the nozzle, and further defining a plurality of secondary openings positioned across the nozzle chamber from the side openings at the front end of the holder for creating a secondary flow of gas therethrough.

32. An electrode according to claim 31, further comprising a valve assembly located in the internal bore of the upper tubular member, said ball valve assembly capable of regulating the gas through the electrode.

33. An electrode according to claim 31, wherein the side openings in said holder are arranged to impart a swirling motion to the gas exiting the side openings.

34. An electrode according to claim 31, wherein the plurality of side openings defined by the holder are located at a position less than ½ the length of the holder along the longitudinal axis from the front face of the holder.

35. An electrode according to claim 31, wherein the holder includes a threaded portion for threadably securing the holder to the upper tubular member.

* * * * *

UNITED STATES PATENT AND TRADEMARK OFFICE

CERTIFICATE OF CORRECTION

PATENT NO. : 6,362,450 B1
DATED : March 26, 2002
INVENTOR(S) : Severance, Jr.

It is certified that error appears in the above-identified patent and that said Letters Patent is hereby corrected as shown below:

<u>Column 10,</u>
Line 50, "farther" should read -- further --.

<u>Column 12,</u>
Line 12, "arc" should read -- are --.

Signed and Sealed this

Eleventh Day of June, 2002

*Attest:*

JAMES E. ROGAN

*Attesting Officer* *Director of the United States Patent and Trademark Office*

US006362450C1

(12) EX PARTE REEXAMINATION CERTIFICATE (5966th)

United States Patent

(10) Number: US 6,362,450 C1

(45) Certificate Issued: Oct. 23, 2007

Severance, Jr.

(54) GAS FLOW PLASMA ARC TORCH

(75) Inventor: Wayne Stanley Severance, Jr., Darlington, SC (US)

(73) Assignee: The ESAB Group, Inc., Florence, SC (US)

Reexamination Request:
No. 90/007,257, Oct. 14, 2004

Reexamination Certificate for:
Patent No.: 6,362,450
Issued: Mar. 26, 2002
Appl. No.: 09/772,652
Filed: Jan. 30, 2001

Certificate of Correction issued Jun. 11, 2002.

(51) Int. Cl.
*B23K 9/00* (2006.01)
*B23K 9/02* (2006.01)

(52) U.S. Cl. .................. 219/121.5; 219/75; 219/121.51

(58) Field of Classification Search .............. 219/121.5, 219/121.51, 121.52, 121.48, 121.36, 121.57, 219/121.54, 74, 75; 239/690, 690.1, 548, 239/549, 552
See application file for complete search history.

(56) References Cited

U.S. PATENT DOCUMENTS 3,004,189 A 10/1961 Giannini
3,042,830 A 7/1962 Orbach
3,562,486 A 2/1971 Hatch et al.
4,463,245 A * 7/1984 McNeil ................. 219/121.48
4,558,201 A 12/1985 Hatch
4,580,032 A 4/1986 Carkhuff
4,590,354 A 5/1986 Marhic et al.
4,650,953 A 3/1987 Eger et al.
4,877,937 A 10/1989 Müller
4,973,816 A 11/1990 Haberman
4,992,642 A 2/1991 Kamp et al.
5,023,425 A 6/1991 Severance, Jr.
5,216,221 A 6/1993 Carkhuff
5,235,155 A * 8/1993 Yamada et al. ........ 219/121.39
5,278,388 A 1/1994 Huang
5,317,126 A * 5/1994 Couch et al. .......... 219/121.51
5,681,489 A * 10/1997 Carkhuff ................ 219/121.48
5,726,415 A 3/1998 Luo et al.

* cited by examiner

*Primary Examiner*—Jeanne M Clark

(57) ABSTRACT

A plasma arc torch and method are provided for directing a flow of gas substantially the length of an electrode before splitting the gas into a primary flow and a secondary flow. The torch includes an electrode having a metallic holder defining a plurality of openings at a forward end for directing all of the gas therethrough and into a chamber defined by the holder and a nozzle. The nozzle defines a central bore and a plurality of secondary openings for splitting the gas in the nozzle chamber into at least the primary flow and the secondary flow.

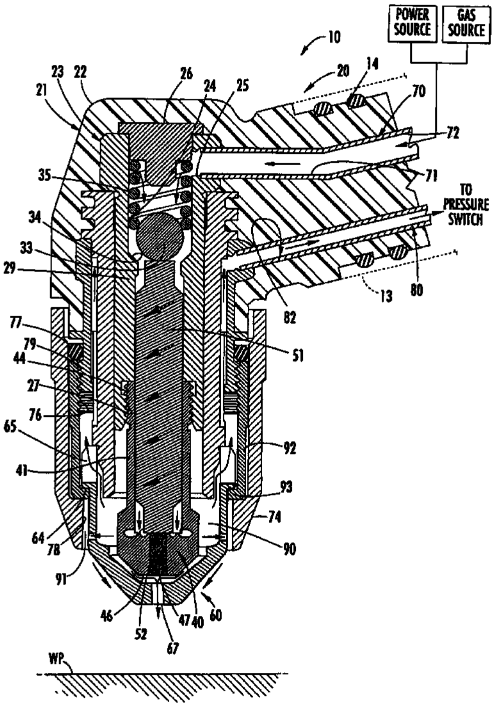

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 8–15 and 23–30 are cancelled.

Claims 2, 4–7, 16–22 and 31 are determined to be patentable as amended.

Claims 32–35, dependent on an amended claim, are determined to be patentable.

2. A plasma arc torch [according to claim 1], *comprising:*

*an electrode including an upper tubular member defining an internal bore therethrough and a metallic holder having a front end and a rear end along a longitudinal axis, the front end having a front face defining a front cavity having at least an emissive element positioned therein, the rear end defining a central passageway in fluid communication with the internal bore for directing gas from the rear end to the front end of the holder, the holder further defining a plurality of side openings positioned proximate the front end of the holder that are in fluid communication with the central passageway;*

*a nozzle positioned proximate the front end of the holder and defining a nozzle chamber therebetween, said nozzle defining a central bore for discharging a primary flow of gas from the nozzle chamber toward a workpiece located adjacent the nozzle, the nozzle being held in place about the holder;*

*an electrical supply for creating an arc extending from the emissive element of said electrode through the central bore and to the workpiece; and*

*a gas supply line through which all gas used by the torch is supplied, the gas supply line directing all of the gas to the central passageway of said electrode, wherein all of the gas is directed to the nozzle chamber from the central passageway through the side openings defined by the holder;* wherein the nozzle [further defines] *includes a tubular wall surrounding the nozzle chamber, the tubular wall defining* a plurality of secondary openings *therethrough* positioned across the nozzle chamber from the side openings at the front end of the metallic holder, the secondary openings creating a secondary flow of gas therethrough.

4. A plasma arc torch according to claim [1] *2*, further comprising a pressure detecting device in fluid communication with the nozzle chamber, said pressure detecting device disabling the torch if gas pressure in the nozzle chamber is below a predetermined value.

5. A plasma arc torch according to claim [1] *2*, wherein the side openings in the holder are arranged to impart a swirling motion to the gas flowing into the nozzle chamber.

6. A plasma arc torch according to claim [1] *2*, wherein the side openings defined by the holder are located at a position less than ½ the length of the holder along the longitudinal axis from the front face of the holder.

7. A plasma arc torch according to claim [1] *2*, wherein the upper tubular member defines a threaded portion and the holder defines a threaded portion for threadably securing the holder to the upper tubular member*, the holder being removable from the torch while the upper tubular member remains in the torch*.

16. A method [according to claim 14] *of operating a plasma arc torch* [farther] comprising*:*

*providing an electrode along a longitudinal axis having a metallic holder having a front end and a rear end defining a central passageway, the holder further defining a plurality of side openings that are in fluid communication with the central passageway, and a nozzle positioned proximate the front end of the holder defining a nozzle chamber between the nozzle and the holder, the nozzle being held in place about the holder, the nozzle including a tubular wall surrounding the nozzle chamber;*

*directing a flow of gas from the central passageway into the nozzle chamber such that all of the gas is directed through the side openings into the nozzle chamber; and*

*splitting the flow of gas into at least a primary flow and a secondary flow after the flow of gas has entered the nozzle chamber, directing the primary flow of gas towards a workpiece through a central bore defined by the nozzle, and* directing the secondary flow of gas through a plurality of secondary openings [defined by] *formed through the tubular wall of* the nozzle.

17. A method according to claim [13] *16*, wherein the flow of gas *into the central passageway* is directed through a flow regulating device in fluid communication with the central passageway.

18. A method according to claim [13] *16*, further comprising detecting pressure in the nozzle chamber, wherein the torch is disabled if the pressure is below a predetermined value.

19. A method according to claim [13] *16*, wherein the gas is directed into the nozzle chamber by swirling the gas via the side openings in the holder.

20. A method according to claim [13] *16*, wherein all of the gas is directed through the central passageway of the holder a distance more than ½ the length of the holder along the longitudinal axis before being directed through the side openings thereof.

21. A method according to claim [13] *16*, further comprising supplying an electrical current to the electrode to create an electrical arc extending from the electrode to the workpiece.

22. A method according to claim [13] *16*, wherein the gas is swirled in the central passageway as the gas is directed to the side openings of the holder.

31. An electrode adapted for supporting an arc in a plasma arc torch, comprising:

an upper tubular member defining an internal bore therethrough and a threaded portion at one end thereof;

a metallic tubular holder defining a longitudinal axis and having a front *end* and *a* rear end, and a transverse end wall closing the front end, the transverse end wall having a front face and defining a cavity formed in the front face extending rearwardly along the longitudinal axis, the rear end defining a central passageway in fluid communication with the internal bore for directing a gas to the front end of said holder, said holder further defining a plurality of side openings positioned proximate the front end of said holder that are in fluid communication with the central passageway such that the gas can exit the central passageway only via the side openings positioned proximate the front end of said holder; and a nozzle positioned proximate the front end of said holder and defining a nozzle chamber therebetween, *the nozzle including a tubular wall surrounding the nozzle chamber,* said nozzle defining a central bore for discharging a primary flow of gas from the nozzle chamber toward a workpiece located adjacent the nozzle, *the nozzle being held in place about the holder,* and [further defining] *wherein* a plurality of secondary openings *extend through the tubular wall of the nozzle, the secondary openings being* positioned across the nozzle chamber from the side openings at the front end of the holder for creating a secondary flow of gas therethrough.

* * * * *